(12) United States Patent
Park et al.

(10) Patent No.: US 9,031,833 B2
(45) Date of Patent: May 12, 2015

(54) COMMUNICATION APPARATUS

(75) Inventors: Cheol Yong Park, Daejeon (KR); Ki Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 556 days.

(21) Appl. No.: 13/158,233

(22) Filed: Jun. 10, 2011

(65) Prior Publication Data

US 2012/0010878 A1 Jan. 12, 2012

(30) Foreign Application Priority Data

Jul. 7, 2010 (KR) .................... 10-2010-0065250

(51) Int. Cl.
| | |
|---|---|
| *G10L 19/00* | (2013.01) |
| *G10L 19/03* | (2013.01) |
| *G10L 21/00* | (2013.01) |
| *H04L 12/66* | (2006.01) |

(52) U.S. Cl.
CPC ...................... *H04L 12/66* (2013.01)

(58) Field of Classification Search
USPC .............. 704/203, 201, 270, 270.1, 275, 501, 704/502, 503, 504
See application file for complete search history.

(56) References Cited

U.S. PATENT DOCUMENTS

| | | | | |
|---|---|---|---|---|
| 5,812,534 | A  * | 9/1998 | Davis et al. .................... | 370/260 |
| 5,815,505 | A  * | 9/1998 | Mills .............................. | 370/522 |
| 6,172,987 | B1 * | 1/2001 | Razazian et al. ............... | 370/468 |
| 6,233,320 | B1 * | 5/2001 | Haimi-Cohen ............ | 379/88.27 |
| 7,366,712 | B2 * | 4/2008 | He et al. ................................ | 1/1 |
| 7,545,868 | B2 * | 6/2009 | Kennedy et al. ............... | 375/259 |
| 8,295,446 | B1 * | 10/2012 | Apple et al. ................. | 379/88.01 |
| 8,320,914 | B2 * | 11/2012 | Madhavan et al. ......... | 455/435.1 |
| 2002/0184197 | A1 * | 12/2002 | He et al. ........................... | 707/3 |
| 2005/0166117 | A1 * | 7/2005 | Suwa ............................. | 714/746 |
| 2006/0229090 | A1 * | 10/2006 | LaDue ......................... | 455/507 |
| 2006/0287003 | A1 * | 12/2006 | Moinzadeh et al. .......... | 455/557 |
| 2007/0133758 | A1 * | 6/2007 | Bennett et al. ............... | 379/67.1 |
| 2008/0243277 | A1 * | 10/2008 | Kadel .............................. | 700/94 |
| 2008/0305815 | A1 * | 12/2008 | McDonough ................. | 455/466 |
| 2009/0304057 | A1 * | 12/2009 | Werner et al. ................. | 375/222 |
| 2010/0167727 | A1 * | 7/2010 | Madhavan et al. ............ | 455/434 |
| 2011/0039559 | A1 * | 2/2011 | Yi et al. ...................... | 455/435.2 |

FOREIGN PATENT DOCUMENTS

WO          03/071521 A1    8/2003

OTHER PUBLICATIONS

"Robust Speech Recognition and Understanding", ISBN 987-3-90213-08-0, pp. 460, I-Tech, Vienna, Austria, Jun. 2007, University of Granada Spain (Open Access Database www.i-techonline.com).*
N. N. Katugampala et al., "Real-Time End-to-End Secure Voice Communications Over GSM Voice Channel", Center for Communication Systems Research, University of Surrey, United Kingdom.

* cited by examiner

*Primary Examiner* — Edgar Guerra-Erazo
(74) *Attorney, Agent, or Firm* — LRK Patent Law Firm

(57) ABSTRACT

Provided is a communication apparatus for direct communication between networks of different types. The communication apparatus includes a transmission data selector determining whether or not data input from a first communication network is speech data, a data processor digitizing and packetizing the data transferred from the transmission data selector, and a modem for converting the digitized and packetized data into analog data and then directly transmitting the analog data to a second communication network different from the first communication network through a speech channel.

12 Claims, 2 Drawing Sheets

COMMUNICATION APPARATUS

CROSS-REFERENCE TO RELATED APPLICATION

This application claims the benefit of Korean Patent Application No. 10-2010-0065250, filed Jul. 7, 2010, the disclosure of which is hereby incorporated herein by reference in its entirety.

BACKGROUND

1. Field of the Invention

The present invention relates to a communication apparatus for direct communication between networks of different types (Heterogeneous Networks), and more particularly to a communication apparatus which removes the necessity of a gateway for converting data into data formats suitable for different types in the heterogeneous networks to remove a transmission delay factor and enable real-time speech and data communication.

2. Discussion of Related Art

Currently, a gateway is disposed between a public switched telephone network (PSTN) and an ultra-high frequency (UHF)-amplitude modulation (AM) network, which are different types of heterogeneous networks, for speech communication or general data communication between the networks. Pieces of speech data, general data, etc. received from the respective networks are converted and processed according to predetermined data standards at the gateway. The data standards are defined in the respective networks, and the pieces of converted and processed data are transmitted to users in the networks.

FIG. 1 shows a constitution of a conventional system for data communication between a PSTN and a UHF-AM network.

Referring to FIG. 1, the data communication system between the PSTN and the UHF-AM network includes a PSTN telephone 110, a terminal 120 for data transmission, and a modem 130 present in the PSTN, a gateway 140 relaying data communication, and a radio 150, a handset 160, and a terminal 170 for data transmission present in the UHF-AM network.

Speech communication is performed in the system shown in FIG. 1 as follows. When a user wants to send speech data through the PSTN telephone 110, the PSTN telephone 110 converts the corresponding speech data into a pulse code modulation (PCM) signal according to the PSTN and transmits the PCM signal to the gateway 140. The gateway 140 converts the transmitted PCM signal into an AM signal and then wirelessly transmits the AM signal to the user radio 150. The transmitted AM signal is demodulated by the radio 150. The demodulated signal is transferred to a user through the handset 160. This is a description of a case in which speech is transmitted from the PSTN to the UHF-AM network, and speech transmission in the reverse direction is performed in the same way.

Also, when secure speech communication is performed, an information security scheme (cryptographic equipment, e.g., a scrambling method) can be applied to the PSTN telephone 110 to perform secure communication with the gateway 140. At this time, at the gateway 140, a transmitted encryption data is reprocessed (decrypted and then encrypted again), and the reprocessed data is wirelessly transmitted to the user radio 150. The user can receive the data through the handset 160.

Meanwhile, data communication is performed as follows. Data input through the terminal 120 for data transmission in the PSTN is transmitted to the gateway 140 through the PSTN modem 130. The terminal 120 for data transmission may be a personal computer (PC) or a terminal dedicated to data transmission other than a PC. The gateway 140 amplitude-modulates the transmitted data and transmits the amplitude-modulated data to the radio 150 present in the UHF-AM network, and the data transmitted to the radio 150 is demodulated and transferred to the user through the terminal 160 for data transmission. This is a description of a case in which data is transmitted from the PSTN to the UHF-AM network, and data transmission in the reverse direction is performed in the same way.

Also, when secure data communication is performed, data to which an information security scheme is applied by the terminal 120 for data transmission in the PSTN may be transmitted to the gateway 140 through the modem 130, or data input through the terminal 120 for data transmission may be transmitted to the gateway 140 with an information security scheme applied by the modem 130. The terminal 120 for data transmission and the gateway 140 perform secure communication in the former method, and the modem 130 and the gateway 140 perform secure communication in the latter method. An information security scheme (cryptographic equipment, e.g., the scrambling method) suitable for the UHF-AM network is applied to the data transmitted to the gateway 140, and the data is transmitted to the radio 150 present in the UHF-AM network. At this time, an information security scheme may be applied to the terminal 120 for data transmission itself in the UHF-AM network for the sake of secure communication between the gateway 140 and the terminal 170 for data transmission, or a wireless channel information security scheme (an analog scrambling scheme) may be employed at the gateway 140 for the sake of secure communication between the gateway 140 and the radio 150.

Speech data or general data is converted into a data format appropriate for each network while passing through a gateway. At this time, the speech data or general data is inevitably transmitted with a delay factor caused by the conversion. The conversion becomes a delay factor in speech communication which must be performed in real time, and requires an additional modem suitable for each network for the sake of data transmission.

Also, when secure communication is performed, an information security scheme suitable for a PSTN network must be reprocessed (decrypted and then re-encrypted) according to an information security scheme suitable for UHF-AM network at a gateway. Thus, the gateway inevitably has security vulnerability.

Furthermore, separate information security schemes are required for speech and data.

SUMMARY OF THE INVENTION

The present invention is directed to enabling direct speech/data communication between communication apparatuses present in respective different types of networks (heterogeneous networks) to remove the necessity of a gateway converting data into data formats suitable for the respective networks, and thereby removing a delay factor and enabling real-time communication.

The present invention is also directed to applying a common information security scheme to communication apparatuses present in respective different types of networks during secure communication between the networks to remove the necessity of a gateway reprocessing data according to information security schemes suitable for the respective networks, and thereby removing a delay factor and enabling real-time communication.

The present invention is also directed to processing speech data and non-speech data communication between different types of networks by one module and thereby enabling an efficient network configuration.

One aspect of the present invention provides a communication apparatus including: a transmission data selector for determining whether or not data input from a first communication network is speech data; a data processor for digitizing and packetizing the data transferred from the transmission data selector; and a modem for converting the digitized and packetized data into analog data and then directly transmitting the analog data to a second communication network different from the first communication network through a speech channel.

The data processor may include: a speech data processor for digitizing and packetizing the input data determined to be speech data by the transmission data selector through a vocoder codec; and a non-speech data processor for packetizing the input data determined to be non-speech data by the transmission data selector.

The communication apparatus may further include a cryptographic processor for encrypting the data digitized and packetized by the data processor and transferring the encrypted data to the modem.

The encryption may be performed according to a digital information security scheme.

The data input from the first communication network be input through a handset or terminal in the first communication network.

The speech channel may be a speech channel of a telephone or radio capable of wired and wireless speech communication.

The first communication network and the second communication network may be one of public switched telephone network (PSTN) and an ultra-high frequency (UHF)-amplitude modulation (AM) network.

Another aspect of the present invention provides a communication apparatus including: a modem for digitizing and packetizing data directly transmitted from a first communication network through a speech channel, and present in a second communication network different from the first communication network; a data processor for converting the digitized and packetized data into analog data; and a transmission data output unit for determining whether or not the analog data is speech data and outputting the analog data through an output means in the second communication network.

The data processor may include: a speech data processor for converting the speech data digitized and packetized by the modem into analog data through a vocoder codec; and a non-speech data processor for converting the non-speech data and packetized by the modem into analog data.

The communication apparatus may further include a cryptographic processor for decrypting the data digitized and packetized by the modem.

The output means may be a handset or a terminal.

The speech channel may be a speech channel of a telephone or radio capable of wired and wireless speech communication.

The first communication network and the second communication network may be one of a PSTN and a UHF-AM network.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Constitution of Entire System

Figure 1:
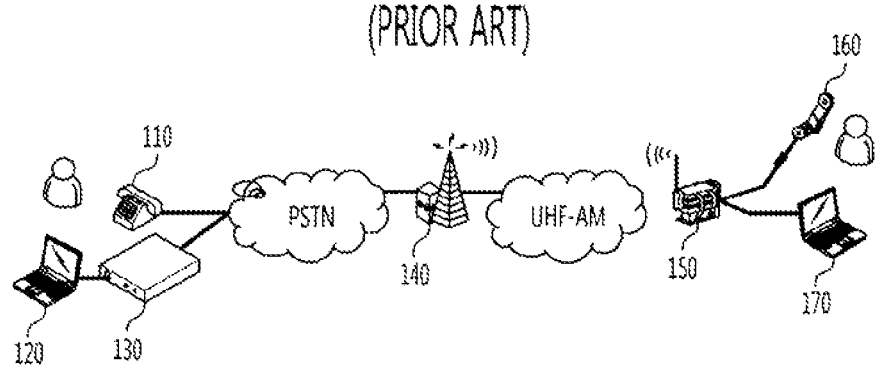
FIG. 1 shows a constitution of a conventional system for speech data and non-speech data communication between a public switched telephone network (PSTN) and an ultra-high frequency (UHF)-amplitude modulation (AM) network according to an exemplary embodiment of the present invention.
Figure 2:
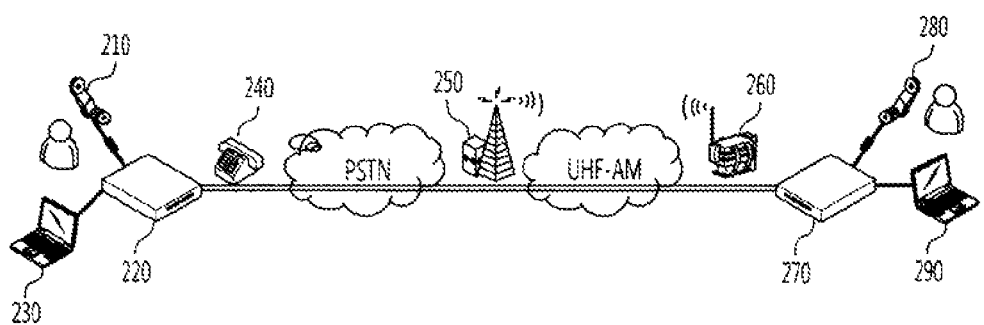
FIG. 2 shows a constitution of a system for speech data and non-speech data communication between different types of networks according to an exemplary embodiment of the present invention.

FIG. 2 shows a constitution of a system for speech data and non-speech data communication between different types of networks according to an exemplary embodiment of the present invention.

Referring to FIG. 2, the system according to an exemplary embodiment of the present invention includes a handset 210 for a first communication network, a communication apparatus 220 for the first communication network, a terminal 230 for the first communication network, a transceiver 240 for the first communication network, a transceiver 260 for a second communication network, a communication apparatus 270 for the second communication network, a handset 280 for the second communication network, and a terminal 290 for the second communication network. Like in the conventional art, the system according to an exemplary embodiment of the present invention may further include a gateway 250, but the gateway 250 may be omitted.

The first and second communication networks may be different types of networks (heterogeneous networks). According to an exemplary embodiment of the present invention, the first communication network may be a PSTN, and the second communication network may be a UHF-AM network. This case is shown in FIG. 2. For convenience, description will be made below on the assumption that the first communication network is a PSTN and the second communication network is a UHF-AM network.

The terminals 230 and 290 according to an exemplary embodiment of the present invention are digital devices capable of wired and wireless communication. Here, the term "terminal" is to be understood as a digital apparatus which has a memory means and a microprocessor for a computing capability such as a personal computer (PC) (e.g., a desktop computer or a laptop computer), a workstation, a personal digital assistant (PDA), a web pad, a cellular phone, or a navigation device.

The transceivers 240 and 260 according to an exemplary embodiment of the present invention perform data transmission between the different types of networks (heterogeneous networks). The transceivers 240 and 260 may have speech channels, and speech data and non-speech data may be transmitted to the other networks through the speech channels of the transceivers 240 and 260 after undergoing a predetermined process. According to an exemplary embodiment of the present invention, the transceivers 240 and 260 may be general telephones, radios, etc., which have speech channels and are capable of wired and wireless communication.

During speech data or general data (non-speech data) communication according to an exemplary embodiment of the present invention, speech data or non-speech data is input through an input means. In FIG. 2, the handset 210 and the terminal 230 are shown as examples of the input means. Speech data can be input through the handset 210, and non-speech data can be input through the terminal 230. The speech data or non-speech data input through the handset 210 or the terminal 230 is transferred to the communication apparatus 220. A predetermined process is performed on the speech data or non-speech data transferred to the communication apparatus 220, and the speech data or non-speech data is transmitted to the transceiver 260 of a receiving side through the speech channel of the transceiver 240. The speech data or non-speech data transmitted to the transceiver 260 is transferred to the communication apparatus 270, undergoes a predetermined process, and then is output through an output means. In FIG. 2, the handset 280 and the terminal 290 are shown as examples of the output means. The speech data can be output through the handset 280, and the non-speech data can be output through the terminal 290.

In an exemplary embodiment of the present invention, speech data and non-speech data are directly transmitted through the speech channels of the transceivers 240 and 260 respectively present in the different types of networks. Thus, a data conversion or modulation process for communication between different types of communication networks is not required, and a communication delay factor is reduced. However, like in the conventional art, the gateway 250 may also be employed. To be specific, speech data or non-speech data to be transmitted may be transferred to the gateway 250 via the communication apparatus 220 through the speech channel of the transceiver 250. After the speech channel is amplitude-modulated by the gateway 250, the speech data or non-speech data may be transmitted to the transceiver 260. The amplitude modulation serves to convert the transmitted data into a speech channel format suitable for the UHF-AM network, which is the second communication network.

Meanwhile, secure communication is performed for speech data or general data in the same way as described above except that the speech data or general data may be encrypted according to a predetermined method by the communication apparatus and transferred to the communication apparatus 270 of the receiving side during data transmission. The data transferred to the communication apparatus 270 can be decrypted and transferred to the handset 280 or the terminal 290. The encryption method of the communication apparatus 220 of the transmitting side may be the same as the decryption method of the communication apparatus 270 of the receiving side. For example, a digital information security scheme such as a private key encryption scheme or a public key encryption scheme may be used.

Even when data communication is performed between the first and second communication networks, the gateway 250 does not need to perform decryption and re-encryption processes, that is, a decryption process according to an information security scheme suitable for the first communication network and then a re-encryption process according to an information security scheme suitable for the second communication network, because the encryption method of the transmitting side is the same as the decryption method of the receiving side. Thus, a communication delay and security vulnerability factor can be removed. This can also be realized by the gateway 250, like in the conventional method. To be specific, the gateway 250 may decrypt and re-encrypt data which is encrypted by the communication apparatus 220 according to the encryption method and transmitted, and the data may be transferred to the communication apparatus 270 so that secure communication can be performed.

Thus far, a case in which speech data and non-speech data are transmitted from the communication apparatus 220 present in the first communication network to the communication apparatus 270 present in the second communication network has been described. Also in the reverse direction, speech data and non-speech data are transmitted in the completely same way.

Constitutions of the communication apparatuses 220 and 270 will be described below, and overall operation of the communication system according to an exemplary embodiment of the present invention will be described in detail with reference to the constitutions.

Communication Apparatus

Figure 3A:
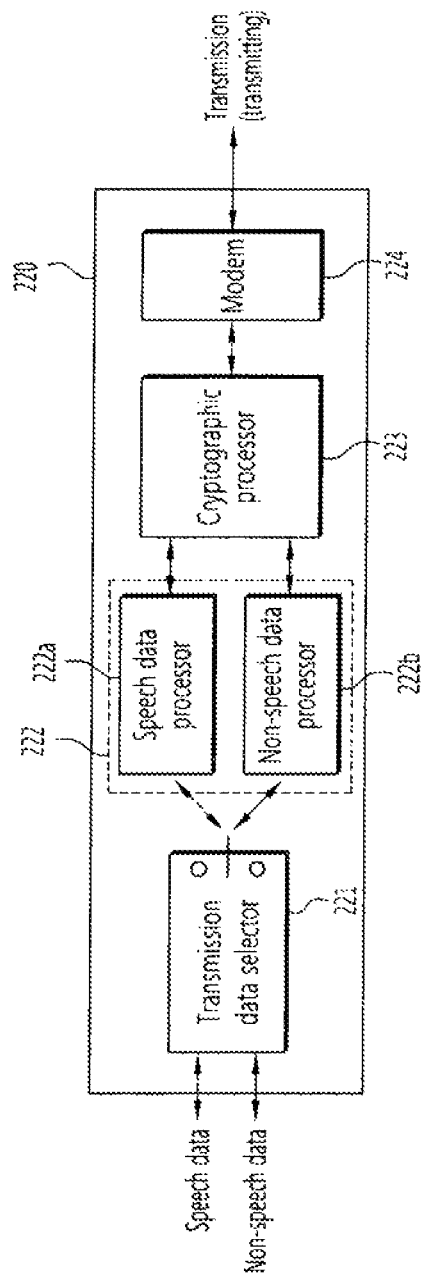
FIGS. 3A and 3B are block diagrams of a communication apparatus for a first communication network and a communication apparatus for a second communication network according to an exemplary embodiment of the present invention.
Figure 3B:
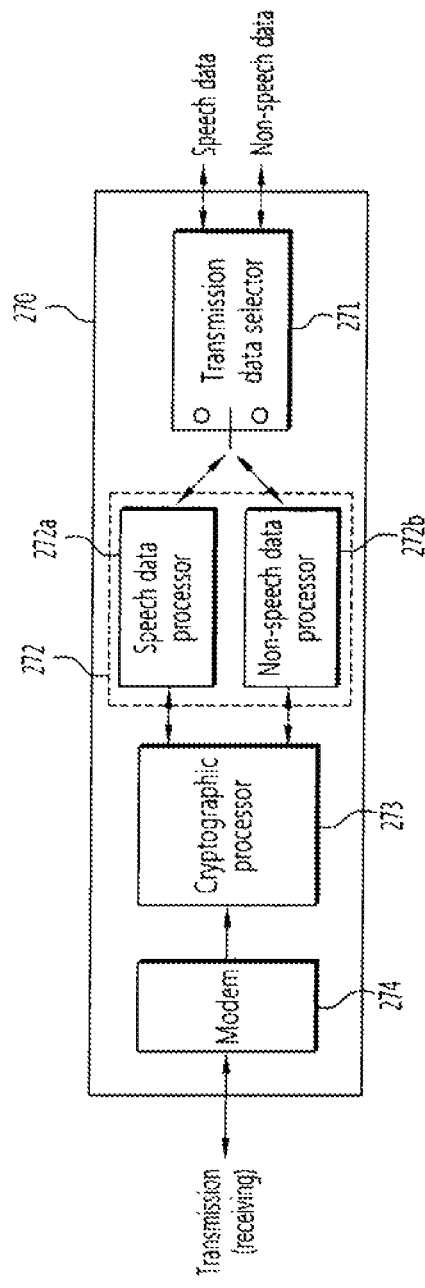

FIGS. 3A and 3B are block diagrams of the communication apparatus 220 for the first communication network and the communication apparatus 270 for the second communication network according to an exemplary embodiment of the present invention.

Referring to FIG. 3A, the communication apparatus 220 for the first communication network includes a transmission data selector 221, a data processor 222, a cryptographic processor 223, and a modem 224. Referring to FIG. 3B, the communication apparatus 270 for the second communication network also includes a transmission data output unit 271, a data processor 272, a cryptographic processor 273, and a modem 274. Here, the data processor 222 includes a speech data processor 222a and a non-speech data processor 222b, and the data processor 272 also includes a speech data processor 272a and a non-speech data processor 272b.

The transmission data selector 221 and the transmission data output unit 271 have different functional names but perform functions corresponding to each other. A case in which speech data and non-speech data are transmitted from the first communication network to the second communication network will be described below. However, when communication is performed in the reverse direction, the transmission data selector 221 can serve as a transmission data output unit, and the transmission data output unit 271 can serve as a transmission data selector.

For speech data or non-speech data transmission according to an exemplary embodiment of the present invention, the communication apparatuses 220 and 270 operate as follows. Speech data can be input through the handset 210, and general data can be input through the terminal 230. Speech data or non-speech data input through the handset 210 or the terminal 230 is transferred to the communication apparatus 220. The transmission data selector 221 of the communication apparatus 220 determines whether or not the transferred data is speech data, and specifies a path through which the data will be transferred. The speech data or non-speech data passing through the transmission data selector 221 is transferred to the data processor 222 and can be digitized and packetized. As mentioned above, the data processor 222 includes the speech data processor 222*a* and the non-speech data processor 222*b*. When the transmission data selector 221 determines that the transferred data is speech data, the data is transferred to the speech data processor 222*a*, and when the transferred data is determined to be non-speech data, the data is transferred to the non-speech data processor 222*b*. The speech data processor 222*a* electrically analyzes or combines the transferred analog speech data through a vocoder codec, thereby performing digitization and packetization. The vocoder codec can process the speech signal using a common method, which will not be described in detail. Meanwhile, the non-speech data processor 222*b* packetizes the transferred non-speech data. The packetization can be performed according to a data transmission speed, and so on. The data digitized and packetized by the speech data processor 222*a* or the non-speech data processor 222*b* is transferred to the modem 224. The cryptographic processor 223 functions to apply an encryption method to data during secure communication, and thus can be bypassed when secure communication is not performed. The modem 224 converts the digitized data into analog data to load it into the speech channel of the transceiver 240. The speech data or non-speech data converted into analog data by the modem 224 is directly transmitted to the transceiver 260 of the second communication network through the speech channel of the transceiver 240. The data received through the speech channel of the transceiver 260 is transferred to the communication apparatus 270. The modem 274 of the communication apparatus 270 digitizes and packetizes the received analog data. The data digitized and packetized by the modem 274 is transferred to the data processor 272 and converted into analog data. As mentioned above, the data processor 272 includes the speech data processor 272*a* and the non-speech data processor 272*b*. At this time, the cryptographic processor 273, which decrypts data transferred during secure communication, also can be bypassed. When the received data is speech data, it is transferred to the speech data processor 272*a*, converted into analog data by a vocoder codec, and then output to an output means through the transmission data output unit 271. On the other hand, when the received data is non-speech data, it is transferred to the non-speech data processor 272*b*, converted into analog data, and then output to the output means through the transmission data output unit 271. The output means may be the handset 280 for outputting speech data or the terminal 290 for outputting non-speech data. The speech data output unit 271 determines whether or not the transferred data is speech data, and can output the data through the handset 280 when the transferred data is speech data and through the terminal 290 when the transferred data is non-speech data. As described above, data transmission can also be performed through the gateway 250.

Meanwhile, secure communication according to an exemplary embodiment of the present invention is performed for speech data or non-speech data in the same way as described above except that the speech data or non-speech data is further processed by the cryptographic processors 223 and 273 of the communication apparatuses 220 and 270. The cryptographic processor 223 of the communication apparatus 220 present in the first communication network encrypts data digitized and packetized by the speech data processor 222*a* or the non-speech data processor 222*b* and transfers the encrypted data to the modem 224. As mentioned above, the encryption method may be a digital information security scheme. Also, the cryptographic processor 273 of the communication apparatus 270 present in the second communication network can decrypt data which is received, digitized and packetized by the modem 274 and then transfer the decrypted data to the speech data processor 272*a* or the non-speech data processor 272*b*. At this time, the decryption method can be the same as the encryption method used by the cryptographic processor 223 of the first communication network. Since the communication apparatus 220 of the first communication network and the communication apparatus 270 of the second communication network use the same information security scheme, the gateway 250 does not need to perform decryption and re-encryption. Also, with the removal of the gateway 250, a security vulnerability caused when decryption and re-encryption are conventionally performed by the gateway 250 can be improved.

Thus far, a case in which data is transmitted from the communication apparatus 220 present in the first communication network to the communication apparatus 270 present in the second communication network has been described. Also in the reverse direction, data is transmitted in the completely same way.

When data communication is performed between different types of networks according to an exemplary embodiment of the present invention, a single communication method is used, and the necessity of a gateway is removed. Thus, it is possible to expect a reduction of a delay factor and an increase in communication efficiency.

Also, in an exemplary embodiment of the present invention, a common information security scheme is applied to communication apparatuses present in different types of networks during secure communication between the networks. Thus, it is possible to remove the necessity of a gateway reprocessing data according to information security schemes suitable for the respective networks, and a security vulnerability caused by reprocessing at the gateway.

Furthermore, one communication apparatus performs both of speech data communication and non-speech data communication between different types of networks according to an exemplary embodiment of the present invention, so that an efficient network configuration is enabled.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A communication apparatus comprising:
    a transmission data selector determining whether or not data input configured to be sent over a first communication network is speech data;
    a data processor digitizing and packetizing the data transferred from the transmission data selector; and
    a modem converting the digitized and packetized data into analog data and then transmitting the analog data by an end-to-end communication without passing through a gateway through a speech channel to a second communication network which is heterogeneous to the first communication network, the modem configured to perform the end-to-end communication even if it occurs to transcoding in a heterogeneous network.

2. The communication apparatus of claim 1, wherein the data processor includes:
    a speech data processor digitizing and packetizing the input data determined to be speech data by the transmission data selector of the end-to-end communication through a vocoder codec; and a non-speech data processor digitizing and packetizing the input data determined to be non-speech data by the transmission data selector of the end-to-end communication.

3. The communication apparatus of claim 1, further comprising a cryptographic processor encrypting the data digitized and packetized by the data processor and transferring the encrypted data by the end-to-end communication in a heterogeneous network to the modem.

4. The communication apparatus of claim 1, wherein the data input configured to be sent over the first communication network is input through a handset or a terminal in the first communication network.

5. The communication apparatus of claim 1, wherein the speech channel is a speech channel of a telephone or a radio capable of wired and wireless speech communication.

6. The communication apparatus of claim 1, wherein the first communication network and the second communication network are one of a public switched telephone network (PSTN) and an ultra-high frequency (UHF)-amplitude modulation (AM) network.

7. A communication apparatus comprising:
a modem digitizing and packetizing data transmitted by an end-to-end communication without passing through a gateway from a first communication network through a speech channel, and presenting in a second communication network which is heterogeneous to the first communication network, the modem configured to perform the end-to-end communication even if it occurs to transcoding in a heterogeneous network;
a data processor converting the digitized and packetized data into analog data; and
a transmission data output unit determining whether or not the analog data is speech data and outputting the analog data through an output means in the second communication network.

8. The communication apparatus of claim 7, wherein the data processor includes:
a speech data processor converting the speech data digitized and packetized by the modem into analog data through a vocoder codec; and
a non-speech data processor converting the non-speech data digitized and packetized by the modem into analog data.

9. The communication apparatus of claim 7, further comprising a cryptographic processor decrypting the data digitized and packetized by the modem.

10. The communication apparatus of claim 7, wherein the output means is a handset or a terminal.

11. The communication apparatus of claim 7, wherein the speech channel is a speech channel of a telephone or a radio capable of wired and wireless speech communication.

12. The communication apparatus of claim 7, wherein the first communication network and the second communication network are one of a public switched telephone network (PSTN) and an ultra-high frequency (UHF)-amplitude modulation (AM) network.

* * * * *